April 20, 1954 G. B. PITTALUGA 2,675,705
FLUID PRESSURE MEASURING APPARATUS
Filed March 14, 1952
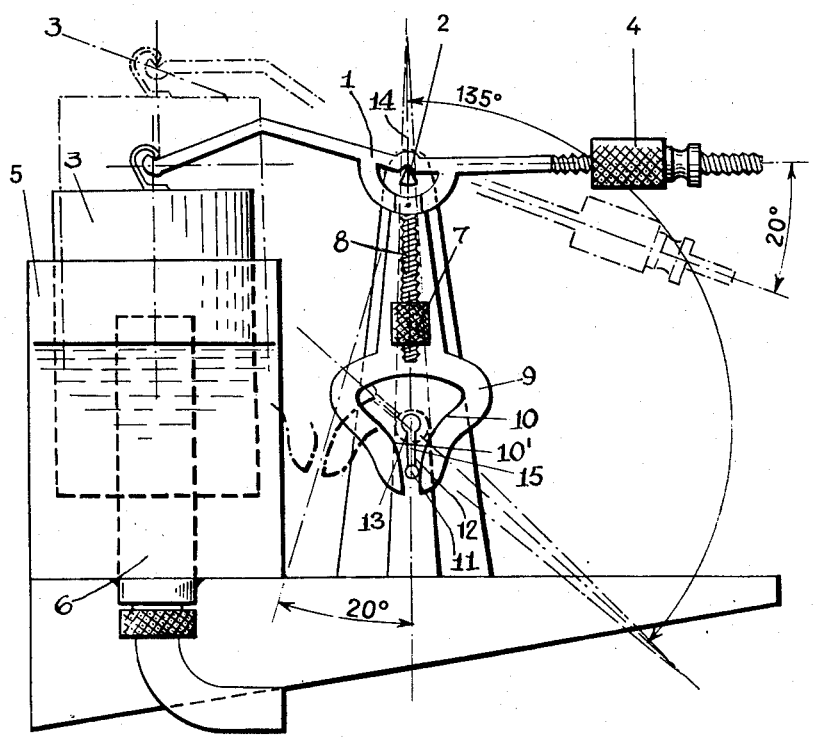
INVENTOR.
Giovanni Battista Pittaluga
BY
Attorney Patented Apr. 20, 1954

2,675,705

UNITED STATES PATENT OFFICE 2,675,705

FLUID PRESSURE MEASURING APPARATUS

Giovanni Battista Pittaluga, Genoa-Cornigliano, Italy, assignor to Societa Finanziaria Siderurgica Finsider per Azioni, Rome, Italy Application March 14, 1952, Serial No. 276,493

Claims priority, application Italy September 6, 1951

3 Claims. (Cl. 73—404)

An accurate measurement of small positive and negative pressures and their variations has become, for many industries, and particularly in the operation of furnaces, increasingly important.

The presently known instruments for effecting such measurements can be divided into two classes:

(a) Wholly mechanical devices, generally comprising a pendulum element; such apparatuses lack sensitivity to small pressure variations, and lack accuracy in returning to the zero point.

(b) Devices which transfer pressure variations into electric current variations; such apparatuses are highly sensitive, but very expensive and complex, and call for skilled maintenance.

The present invention relates to measuring positive and negative pressures and their variations, with amplified indicia on a large diameter circular dial, these features being provided in such a way, that both a very high sensitiveness and sturdiness are obtained, making the apparatus suitable for use in factories as well as in laboratories.

The meter of the invention is characterized by the use of at least one gasometric bell, subjected to positive or negative pressure variations, and movable in response to such variations.

The above mentioned instrument is furthermore characterized by the presence of a system for transmitting the motion from the gasometric bell to the pointer, consisting exclusively of levers, cams and the like.

The meter is particularly characterized by the fact that the system for transmitting the motion from the gasometric bell to the pointer includes a double profiled cam adapted to transmit, amplify and regulate the motion being transmitted from the bell to the pointer.

The meter is furthermore characterized by the presence of a balance yoke, one of the ends of which is connected with the gasometric bell, and the other end is fitted with a load—movable for adjustment—for bringing the system to a state of equilibrium.

The meter is furthermore particularly characterized by the presence, on the oscillating equipment, of a regulating mass—the position of which is adjustable—which is adapted to exert a compensating action, as the gasometric bell gradually moves.

In some of its embodiments, the meter includes more than one of each of the characteristic elements described above.

In the annexed drawing a side view of a preferred embodiment of the object of the invention is shown only by way of example.

The meter is fitted with a balance lever 1, resting on the knife edge 2; one arm of the lever sustains the gasometric bell 3; the other arm bears a counterweight 4, adjustable to bring the lever 1 to a stable equilibrium. The bell 3 is partly immersed in the fluid contained in a small fixed tank 5 and is free to rise or fall from the rest position, in response to a positive or negative pressure variation, with respect to the value for which the lever 1 has been brought to equilibrium, occurring within the gasometric bell through the feeding tube 6.

The action exerted on the bell 3 by the positive or negative pressure change on the equilibrium in the system, is counterbalanced by a counterweight 7—movable for adjustment—screwed on the threaded spindle 8 which is a part of the balance lever 1. A cam 9, having two symmetrical profiled surfaces 10, 10', is connected to the balance lever 1; the positive and negative pressure variations acting on the bell result therefore in an angular shifting of the cam with respect to the knife edge 2. The profile of the cam 9 is, all other conditions remaining the same, the factor determining the value of amplification between the movements of the bell and those of a pointer 14 pivoting on a horizontal axle 13; a small arm 15 is fitted on one end of this axle and is, with its head 11, in contact with the profiled surfaces 10, 10', cooperating with them. The oscillations of both the lever 1 and the cam 9 connected to the lever, cause the arm 15 to rotate, the shape of the profiles 10, 10' being such as to give a very high transmission ratio.

A prototype instrument has been constructed in which the balance lever 1 and the cam connected to it make oscillations of 20° on either side with respect to the equilibrium position, inducing, in turn, the pointer 14 to oscillate 135° on either side with respect to the equilibrium position; the oscillations can be read on a 200 mm. diameter dial. In this way, for a pressure variation causing a one hundredth millimeter shifting of the bell 3, the corresponding displacement of the pointer on the reading dial is about 3 millimeters.

In the instrument, the counterweight 7 is adjusted by bringing it to a position, such that the bell is allowed to make the maximum stroke with the positive and negative pressure variations which are to be measured, in order to obtain an angular shifting of the cam 9 of 20° in either direction with respect to knife edge 2. The meter is sensitive to pressure variations of the order of fractions of a millimeter of $H_2O$; after the instrument has been subjected to a pressure of any value, the pointer 14 goes back to zero without oscillations.

The shape of profiled surfaces 10, 10' shall be determined, through well known geometrical processes, in such manner that the motion from the lever 1 to the pointer 14 will be transmitted according to any desired constant or variable transmission law.

Though, for description's sake, the present invention has been based on the above illustrated example, many modifications may, however, be brought about in the practical embodiments of the object of the invention; for instance, multi-bell types, either with the bells working concomitantly or in opposition, may be constructed; diameters, specific gravities, wall thicknesses and shapes of the various bells may be different or equal; such and other variations are to be considered as being included in the scope of the invention, as defined in the following claims.

What I claim is:

1. An instrument for indicating negative and positive pressure changes in a fluid pressure system comprising, in combination, a receptacle adapted to be connected to the fluid pressure system and to contain a body of liquid, a float vertically movable in said receptacle and having an open end adapted to be submerged in the liquid in the receptacle and to receive the fluid from said system, a first order lever pivoted about a fixed fulcrum and having an adjustable counter-weight on one arm and constructed to support said float on the other arm, means providing two spaced-apart cam surfaces of gradually varying slope, said means being rigidly connected to said lever arm adjacent said fulcrum, a pivoted pointer, and a cam follower connected to said pointer, said cam follower being disposed between said cam surfaces for selective engagement therewith in response to movements of said lever arm about said fixed fulcrum whereby to transmit to said pointer the movements of said float caused by pressure changes in said pressure system.

2. An instrument as defined in claim 1 wherein said means providing said cam surfaces comprises an arm extending at right angles to said lever, two spaced-apart fingers at one end having opposed sides defining said cam surfaces.

3. An instrument as defined in claim 1, further comprising a second adjustable counter-weight connected to said lever adjacent the fulcrum and operable independently of said first-named counter-weight.

References Cited in the file of this patent

UNITED STATES PATENTS

| Number | Name | Date |
|---|---|---|
| 1,371,018 | Bristol | Mar. 8, 1921 |
| 1,870,000 | Cunningham | Aug. 2, 1932 |
| 2,326,835 | Carter | Aug. 17, 1943 |
| 2,333,983 | Carlson | Nov. 9, 1943 |
| 2,485,552 | Aumuller | Oct. 25, 1949 |